April 14, 1959   R. HOERTH   2,881,904
ENDLESS POWER-TRANSMITTING BELT OF FLEXIBLE MATERIAL
Filed Jan. 24, 1956   2 Sheets-Sheet 1

*Inventor:*
ROBERT HOERTH

April 14, 1959 R. HOERTH 2,881,904
ENDLESS POWER-TRANSMITTING BELT OF FLEXIBLE MATERIAL
Filed Jan. 24, 1956 2 Sheets-Sheet 2

*Inventor:*
ROBERT HOERTH
By: *Erich M. v. Radde*

United States Patent Office 2,881,904
Patented Apr. 14, 1959

2,881,904

ENDLESS POWER-TRANSMITTING BELT OF FLEXIBLE MATERIAL

Robert Hoerth, Vlotho-Kalldorf, Germany, assignor to Friedrich K. H. Stuebbe, Weser, Germany Application January 24, 1956, Serial No. 561,122

Claims priority, application Germany February 9, 1955

10 Claims. (Cl. 198—189)

The present invention relates to power-transmitting systems, and more particularly to endless power-transmitting belts of flexible material, which are provided with rack teeth.

Belts of the character described may be used for numerous types of power-transmission, such as transmission of power from a power-driven sprocket, meshing with the teeth of the belt, to another sprocket. Such belts have, however, the disadvantage of stretching longitudinally under the stress of the force imposed upon them. This causes the spacing between the rack teeth to be increased in proportion to the stress so that the teeth no longer mesh with those on a gear wheel over which the belt is passed. On the other hand, when the belt is passed around a sprocket, the belt's upper surface is extended while its toothed undersurface is compressed, thus reducing the spacing of the teeth. This change in the spacing, which depends on the sprocket radius, is superimposed upon the above-mentioned spacing change which depends on the power to be transmitted. The combined result is unsatisfactory meshing of belt and gear wheels.

It is the primary object of the present invention to provide endless power-transmitting belts of flexible material which avoid the above disadvantages and which assure satisfactory meshing of belt and sprockets.

The above and other objects are accomplished in accordance with this invention by providing a sectional transmission belt of flexible material with a longitudinal cavity, arranging on one surface of the belt a plurality of equidistant teeth extending transversely of the belt, and mounting a longitudinally inextensible chain in the belt cavity, the chain links being of such length that the spacing of the teeth is substantially uniformly shortened when the belt is flexed around a sprocket.

The chain in the belt cavity prevents the flexible belt from being stretched and the chain axis remains the axis of the belt under all conditions of flexing, the tooth spacing being accurately shortened by the same amount when the belt passes around a sprocket.

While it is desirable to match the pitch of the chain to that of the belt teeth fairly accurately to obtain uniform reduction of the tooth spacing when the belt passes around the sprocket, the elasticity of the flexible belt will compensate to some extent for irregularities, such as lengthening of the chain due to wear caused by friction between the chain links at their points of contact. Therefore, the length of the chain links may somewhat exceed the tooth spacing as long as the shortening of the tooth distances upon flexing of the belt around a sprocket remains uniform. Short chain links show less wear, particularly when the belt is flexed over sprockets with small radius, since the resulting angle between chain links and the corresponding friction path are smaller.

The above and other objects, features and advantages of the invention will hereinafter be described more particularly in connection with certain now preferred embodiments thereof, taken in conjunction with the accompanying drawing wherein—

Figure 3:
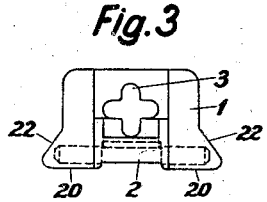
Fig. 3 is an end view of the belt, seen in the direction of arrow III of Fig. 1.

Referring now to the drawing, wherein like reference numerals refer to like parts, there is shown belt 1 of flexible material, such as rubber and the like, having on one of its surfaces equidistant transverse teeth 2. As shown, see Fig. 3, the teeth are formed by metal bolts molded or vulcanized into bearing surfaces 20 of the belt. However, depending on the magnitude of the forces acting on the teeth, the teeth and the belt may be made in one piece and of the same material. In such case, the teeth may be reinforced by inserts of fabric, woven wire or the like. Also, if desired, the teeth may be made of hard rubber, synthetic plastic material, such as a polyamide, and other suitable materials.

In the embodiment illustrated in Figs. 1–4, the belt's central cavity or bore 3 is cruciform in cross section. Arranged snugly within this cavity is chain 4 consisting of short links having straight portions extending lengthwise of the belt, the profile of the chain corresponding to the cross section of the cavity.

As a result thereof the chain links embedded in the belt and the longitudinally extending portions of the chain links lying parallel to the belt teeth will be supported by a large area of the cavity wall. It is desirable that the chain should not consist of round links but, as shown, of links having straight portions extending longitudinally of the chain so that the links extending at right angle to the belt teeth will also be supported by a large area of the cavity wall. This will prevent the chain from biting into the flexible belt even under large tensile forces and/or when bent to a small radius. In this construction, the longitudinal axis of the chain which forms the axis of the belt cannot change its position in the belt so that unpredictable changes in the tooth spacing on bending of the belt are avoided.

Figure 1:
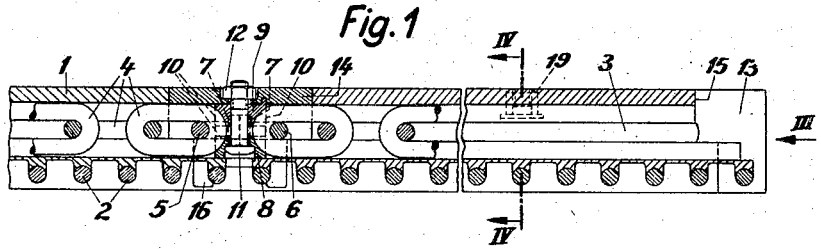
Fig. 1 is a longitudinal section of one embodiment of the belt of this invention, taken along line I—I of Fig. 2.

As shown in Fig. 1, the belt is made in sections and the chain sections are connected by chain joints of such construction that the pitch of the chain remains uniform throughout its length. Sectional structure cheapens the manufacture and permits the belt to be easily and rapidly lengthened or shortened.

As a further result of such a construction the chain will have the same flexibility throughout its entire length and the changes in tooth spacing on bending of the belt will be the same both at the joints and elsewhere.

Each chain joint consists of two half chain links 5 and 6 which are hooked, respectively, into the end links of adjacent chain sections and which, together, are of the same length as a full chain link. The two halves are rigidly connected by locking members 8 and 9 having noses 10 engaging the ends of the half chain links which are formed as hammer heads 7. The locking members are rigidly connected by bolt 11 whose angled or polygonal head is held against rotation in a recess in locking member 8, the bolt being fastened by nut 12.

Each chain joint is mounted in recess 13 provided in the end face of each belt section, the recess being closed by protective covers 14 which are fixed in position by bolt 11 and nut 12. The protective covers abut faces 15 of the belt sections and form an enclosure for the chain joints, protecting them from dust and the like. The belt teeth at each side of the joint are preferably connected by clamps 16 which are laterally spaced from the surface engaging the teeth of the sprocket. Such clamps will ensure correct tooth spacing at the joints of the belt sections.

Chain 4 may be drawn into belt cavity 3 with a lubricant, such as grease, to reduce wear of the chain links at their points of contact. To prevent the rubber of the belt from being attacked by the lubricant, the lubricated chain may first be inserted in a flexible tube of a material which is inert to the lubricant, such as Perbunan or other synthetic material, and tube and chain therein may then be drawn into the belt cavity 3. Alternatively, the tube may be molded or vulcanized into the belt cavity during manufacture of the belt and the lubricated chain may then be inserted in the protective tube forming part of the belt.

Figure 5:
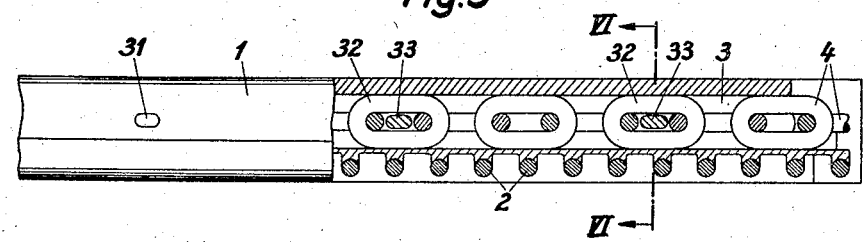
Fig. 5 shows another embodiment of the belt of this invention, partly in elevation and partly in section.
Figure 6:
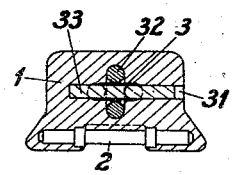
Fig. 6 is a section on line VI—VI of Fig. 5.

Figs. 5 and 6 illustrate a different embodiment of the belt, all parts numbered as in Figs. 1–4 designating the same portions of the belt and being no further described.

When the belt sections are short and of sufficiently large cross section, it will suffice to provide the chain joints with end faces abutting at the joints against the end faces of the belt sections to prevent displacement of the belt in relation to the chain when the tensile force exceeds the friction between the chain and the belt cavity wall. Such a structure is shown in Figs. 1–4. However, when the belt is composed of long sections of relatively small cross section, the extensibility of the flexible belt is naturally increased, the extensibility also depending on the rigidity of the flexible belt material. For instance, a belt of hard rubber will stretch less than a belt of soft rubber. With a more extensible belt, there is danger of displacement of the belt section engaging a sprocket in relation to the associated chain section when the tensile force exceeds the friction between belt cavity wall and chain. The portion of the belt section which has passed the driving sprocket will be pressed by the sprocket against the preceding chain joint and will be crushed while the belt section portion approaching the sprocket will be correspondingly stretched. The tooth spacing in this latter section will be accordingly increased so that the sprocket teeth and the belt teeth will fail to mesh properly.

Figs. 5 and 6 show a structure which avoids the above danger. As shown, belt 1 is provided with transverse apertures 31 extending at right angle to cavity 3 with which they communicate, see Fig. 6. Aperatures 31 terminate at one side of cavity 3 in the wall of belt 1. They are so disposed that each aperture registers with the opening in a chain link 32 so that transverse bolts 33 may be mounted in the apertures and pierce the links. The number of free links between link 32, which are united with the belt by bolts 33, depends upon the extensibility of belt 1.

Although endless belts such as hereinabove described are suitable for many types of power transmission, they have been found to be particularly advantageous for supporting and moving conveyor belts or bucket elevators as well as for endless tracks.

Figure 2:
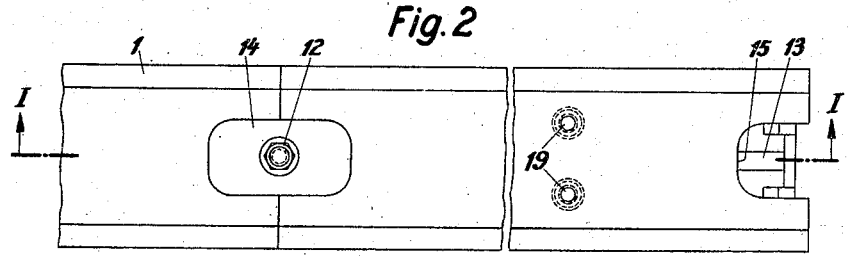
Fig. 2 is a plan view of the belt of Fig. 1.
Figure 4:
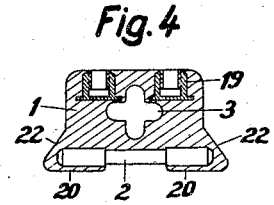
Fig. 4 is a section on line IV—IV of Fig. 1.
Figure 7:
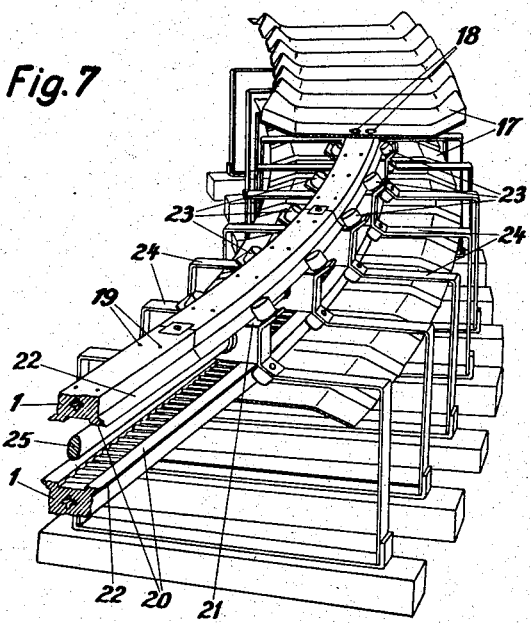
Fig. 7 is a perspective view of a conveyor belt supported and moved by a belt according to this invention.

Fig. 7 illustrates belt 1 as used in connection with endless conveyor 17 travelling along a curved path and attached to the belt by screws 18 inserted in bushings 19 molded or vulcanized into the belt (Figs. 1, 2 and 4). Bearing surfaces 20 of belt 1 are spaced laterally from the portion of teeth 2 which mesh with the sprockets (not shown) and protrude beyond the teeth so that the teeth do not come into contact with rollers 21 which engage bearing surfaces 20. Guide rollers 23 engage belt bearing surfaces 22. Rollers 21 and 23 are mounted in brackets 24 and so arranged that the components of pressure exerted by rollers 21 are opposite to those of rollers 23. The belt is thus guided between the rollers in such a manner that it cannot twist undesirably about its longitudinal axis. The belt portions forming bearing surfaces 20, 22 are stiffened by the ends of metal bolts 2 which form the teeth of the belt. Brackets 24 are interconnected by pressure-resistant struts 25 which are pivoted to the brackets.

Figure 8:
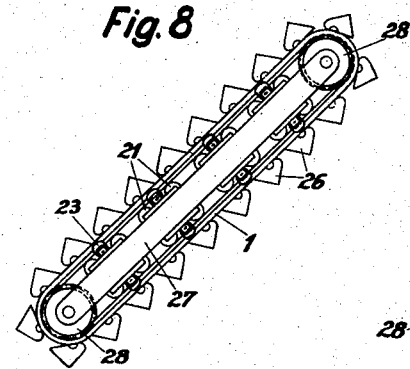
Fig. 8 shows the use of the belt for supporting and imparting motion to a bucket conveyor.

Fig. 8 shows belt 1 used for supporting and moving rubber buckets 26 of a bucket elevator. The buckets are attached to the belt in a similar manner as the conveyor belt of Fig. 7. Frame 27 of the elevator is also provided with rollers 21 and 23 so that the bucket elevator can travel on a curve. Belt 1 passes over sprockets 28 driven by a power source (not shown) in known manner.

Figure 9:
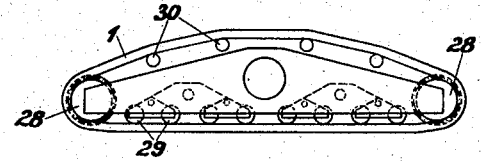
Fig. 9 shows the use of the belt as an endless track.

Fig. 9 shows the application of belt 1 to a full-track vehicle. The endless track 1 is driven by sprockets 28. The vehicle weight is distributed over the part of belt 1 which is in contact with the road by means of rollers 29, which rollers are mounted in a manner known per se to permit the mechanism to adjust itself to irregularities in the surface on which it travels. The upper portion of belt 1 is guided over rollers 30.

While the invention has been described in connection with certain specific embodiments, it will be clearly understood that many modifications and variations may occur to the skilled in the art, particularly after benefitting from the present teaching, without departing from the spirit and scope of the invention as defined in the appended claims.

I claim:

1. An endless power-transmission belt of flexible material and having a plurality of equidistantly spaced teeth arranged transversely to the longitudinal axis of the belt at a bottom surface thereof for engaging a driving sprocket, said belt being composed of a plurality of sections and having a longitudinal cavity, a link chain inserted into said longitudinal cavity, the link chain lying in a plane spaced from the plane of the teeth and comprising a plurality of chain sections, each chain section corresponding to a belt section, and connections joining the chain sections, the chain pitch in the range of the connections and in the chain being the same, and the pitch of the chain being such that the tooth spacing is reduced substantially uniformly when the belt is flexed around the sprocket.

2. The power transmission belt of claim 1, wherein alternate chain links are arranged perpendicularly to each other and the longitudinal belt cavity has a cruciform cross section corresponding to the profile of the link chain.

3. An endless power-transmission belt of flexible material and having a plurality of equidistantly spaced teeth arranged transversely to the longitudinal axis of the belt at a bottom surface thereof for engaging a driving sprocket, said belt being composed of a plurality of sections and having a longitudinal cavity, a link chain inserted into said longitudinal cavity, spaced transverse bolts mounted in the belt and extending through at least some of the chain links for securing the chain against displacement in the belt, the link chain comprising a plurality of chain sections, each chain section corresponding to a belt section, and connections joining the chain sections, the chain pitch in the range of the connections and in the chain being the same and the pitch of the chain being such that the tooth spacing is reduced substantially uniformly when the belt is flexed around the sprocket.

4. The power-transmission belt of claim 3, having transverse bores for receiving the transverse bolts, the bores communicating with at least one surface of the belt and being so spaced that each bore registers with a chain link hole facing it.

5. An endless power-transmission belt of flexible material and having a plurality of equidistantly spaced teeth arranged transversely to the longitudinal axis of the belt at a bottom surface thereof for engaging a driving sprocket, said belt being composed of a plurality of sections and having a longitudinal cavity, a link chain inserted into said longitudinal cavity, the link chain lying in a plane spaced from the plane of the teeth and comprising a plurality of chain sections, each chain section corresponding to a belt section, and chain joints locking the chain sections together, the chain pitch in the range of the chain joints and in the chain being the same and the pitch of the chain being such that the tooth spacing is reduced substantially uniformly when the belt is flexed around the sprocket.

6. The power-transmission belt of claim 5, wherein the chain joints have end faces which abut the end faces of the adjacent belt sections.

7. An endless power-transmission belt of flexible material and having a plurality of equidistantly spaced teeth arranged transversely to the longitudinal axis of the belt at a bottom surface thereof for engaging a driving sprocket, said belt being composed of a plurality of sections and having a longitudinal cavity, a link chain inserted into said longitudinal cavity, the link chain lying in a plane spaced from the plane of the teeth and comprising a plurality of chain sections, each chain section corresponding to a belt section, clamps connecting the outermost teeth of adjoining belt sections, and connections joining the chain sections the chain pitch in the range of the connections and in the chain being the same and the pitch of the chain being such that the tooth spacing is reduced substantially uniformly when the belt is flexed around the sprocket.

8. An endless track locomotion mechanism comprising, in combination, two sprockets and an endless belt of flexible material mounted on said sprockets with a plurality of equidistantly spaced belt teeth arranged transversely to the longitudinal axis of the belt at one surface thereof engaging the sprockets, said belt being composed of a plurality of sections and having a longitudinal cavity, a link chain inserted into said longitudinal cavity, the link chain lying in a plane spaced from the plane of the teeth and comprising a plurality of chain sections, each chain section corresponding to a belt section, and connections joining the chain sections, the chain pitch in the range of the connections and in the chain being the same and the pitch of the chain being such that the tooth spacing is reduced substantially uniformly when the belt is flexed around the sprocket.

9. An endless power-transmission belt of flexible material and having a plurality of equidistantly spaced teeth arranged transversely to the longitudinal axis of the belt at a bottom surface thereof for engaging a driving sprocket, said belt being composed of a plurality of sections and having a longitudinal cavity, a link chain inserted into said longitudinal cavity, the link chain comprising a plurality of chain sections, each chain section corresponding to a belt section, and chain joints locking the chain sections together, the chain pitch in the range of the chain joints and in the chain being the same and the pitch of the chain being such that the tooth spacing is reduced substantially uniformly when the belt is flexed around the sprocket, the chain joints being mounted in lateral recesses in each belt section, a protective cover being mounted over each recess, and each chain joint comprising two locking members and a connecting element, the connecting element also fastening the protective cover in the recess.

10. The power-transmission belt of claim 1, comprising conveying means fixedly connected to the top surface of the belt.

References Cited in the file of this patent

UNITED STATES PATENTS

| | | |
|---|---|---|
| 406,436 | Fail | July 9, 1889 |
| 680,159 | Magaldi | Aug. 6, 1901 |
| 2,061,838 | Johns | Nov. 24, 1936 |
| 2,189,049 | Ungar | Feb. 6, 1940 |
| 2,338,550 | Sloman et al. | Jan. 4, 1944 |
| 2,358,534 | Perry | Sept. 19, 1944 |
| 2,554,372 | Mathieu | May 22, 1951 |

FOREIGN PATENTS

| | | |
|---|---|---|
| 107,805 | Great Britain | July 11, 1917 |
| 289,043 | Great Britain | Sept. 6, 1928 |
| 457,245 | Germany | Mar. 10, 1928 |